US008354790B2

(12) United States Patent
Iwanaga

(10) Patent No.: US 8,354,790 B2
(45) Date of Patent: Jan. 15, 2013

(54) LIGHT SOURCE UNIT WHICH SHINES VISIBLE EXCITATION LIGHT ONTO PHOSPHORS ON A ROTATABLE BASE MATERIAL, AND PROJECTOR INCLUDING THE LIGHT SOURCE

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 228 days.

(21) Appl. No.: 12/464,989

(22) Filed: May 13, 2009

(65) Prior Publication Data
US 2009/0284148 A1    Nov. 19, 2009

(30) Foreign Application Priority Data

May 15, 2008  (JP) .................................. 2008-127947

(51) Int. Cl.
*H01J 1/62* (2006.01)
*H01J 63/04* (2006.01)
*F21V 21/30* (2006.01)

(52) U.S. Cl. .......... 313/506; 313/501; 313/503; 353/84; 353/85; 353/97; 362/293

(58) Field of Classification Search ......................... None
See application file for complete search history.

(56) References Cited

U.S. PATENT DOCUMENTS

| | | | | |
|---|---|---|---|---|
| 6,147,720 A * | 11/2000 | Guerinot et al. | ............. | 348/744 |
| 6,404,548 B1 * | 6/2002 | Tatsuki et al. | ................. | 359/449 |
| 6,547,401 B2 * | 4/2003 | Nishida et al. | ................. | 353/98 |
| 7,871,168 B2 * | 1/2011 | Liu et al. | ......................... | 353/84 |
| 2005/0030659 A1 * | 2/2005 | Asakawa | ...................... | 359/892 |
| 2005/0237500 A1 * | 10/2005 | Ishii et al. | ...................... | 353/122 |
| 2006/0007407 A1 * | 1/2006 | Matsui | ............................. | 353/84 |
| 2007/0019408 A1 | 1/2007 | McGuire, Jr. et al. | | |
| 2007/0024529 A1 * | 2/2007 | Ben-David et al. | ............. | 345/32 |

(Continued)

FOREIGN PATENT DOCUMENTS

JP    2004-341105 A    12/2004

(Continued)

OTHER PUBLICATIONS

Machine English transaltion of JP2004341105 to Kato published Dec. 2, 2004.*

(Continued)

*Primary Examiner* — Sikha Roy
(74) *Attorney, Agent, or Firm* — Holtz, Holtz, Goodman & Chick, PC

(57) ABSTRACT

A projector comprises a light source unit 63, a display device, a cooling fan, a light source side optical system for guiding light from the light source unit 63 to the display device, a projection side optical system for projecting an image emitted from the display device on to a screen, and a projector control unit for controlling the light source unit 63 and the display device. In addition, this light source unit 63 has a plurality of fan-shaped segment areas on a circular transparent base material 130 which can be controlled to rotate, layers 131 of different phosphors which emit light of predetermined wavelength bands by receiving excitation light being disposed on at least two of the segment areas on the transparent base material 130, and comprises an excitation light source 72 which shines excitation light within a visible light wavelength band on to the phosphors.

16 Claims, 7 Drawing Sheets

U.S. PATENT DOCUMENTS

2007/0229777 A1* 10/2007 Tanaka .......................... 353/84
2008/0062546 A1* 3/2008 Davis et al. .................. 359/892
2009/0187234 A1 7/2009 Meyer et al.
2012/0044465 A1* 2/2012 Murai et al. .................... 353/85

FOREIGN PATENT DOCUMENTS

| | | |
|---|---|---|
| JP | 2005-301063 A | 10/2005 |
| JP | 2008-052070 A | 3/2008 |
| WO | WO 2007/141688 A1 | 12/2007 |

OTHER PUBLICATIONS

Machine English translation of JP2008052070 to Takenaka et al. published Mar. 6, 2008.*

Chinese Office Action dated Nov. 30, 2010 (and English translation thereof) in counterpart Chinese Application No. 200910141243.6.

Japanese Office Action dated Apr. 22, 2010 and English translation thereof issued in counterpart Japanese Application No. 2008-127947.

Chinese Office Action dated May 11, 2010 and English translation thereof issued in counterpart Chinese Application No. 200910141243.6.

Korean Office Action dated Jan. 5, 2011 (and English translation thereof) in counterpart Korean Application No. 10-2009-0042070.

* cited by examiner

LIGHT SOURCE UNIT WHICH SHINES VISIBLE EXCITATION LIGHT ONTO PHOSPHORS ON A ROTATABLE BASE MATERIAL, AND PROJECTOR INCLUDING THE LIGHT SOURCE

CROSS-REFERENCE TO RELATED APPLICATIONS

This application is based upon and claims the benefit of priority under 35 USC 119 of Japanese Patent Application No. 2008-127947 filed on May 15, 2008, the entire disclosure of which, including the description, claims, drawings, and abstract, is incorporated herein by reference in its entirety.

BACKGROUND OF THE INVENTION

1. Field of the Invention

The present invention relates to a light source unit and a projector which incorporates the light source unit.

2. Description of the Related Art

In these days, projectors are used in many cases as an image projection apparatus for projecting screens and video images of a personal computer and, further, images based on image data stored in a memory card on to a screen. In projectors of this type, light emitted from a light source is concentrated on to a micromirror display device referred to as a DMD (Digital Micromirror Device) or a liquid crystal panel so as to display a color image on to the screen.

In these projectors, conventionally, projectors employing highly bright discharge lamps as light sources have been the mainstream of projectors. In recent years, however, there have been developments in projectors employing, as light sources, red, green and blue light emitting diodes or solid-state light emitting devices such as an organic electroluminescence display, and there have been made many proposals. For example, Japanese Unexamined Patent Publication No. 2004-341105 proposes a light source unit which is made up of a phosphor layer for converting ultraviolet light emitted from a solid-state light source into visible light, a transparent base material and the solid-state light source.

However, since the proposed light source unit by Japanese Unexamined Patent Publication No. 2004-341105 employs the excitation light source which uses ultraviolet light with high energy as excitation light, the optical component on to which ultraviolet light is shone is liable to be damaged, leading to a problem that ensuring a long life for the optical component becomes difficult.

The problem that the invention is to solve is to provide a light source unit which can maintain its performance over a long period of time by suppressing the deterioration with age of an optical component on to which excitation light is shone and a projector including the light source unit.

SUMMARY OF THE INVENTION

According to a preferred aspect of the invention, there is provided a light source unit having a plurality of segment areas on a circular transparent base material which can be controlled to rotate, layers of different phosphors for emitting light of predetermined wavelength bands by receiving excitation light being disposed on at least two of the segment areas of the transparent base material and comprises an excitation light source for shining excitation light within a visible light wavelength range on to the phosphors.

In addition, according to another preferred aspect of the invention, there is provided a projector comprising a light source unit, a display device, a cooling fan, a light source side optical system for guiding light from the light source unit to the display device, a projection side optical system for projecting an image emitted from the display device on to a screen, and a projector control unit for controlling the light source unit and the display device, wherein the light source unit has a plurality of segment areas on a circular transparent base material which can be controlled to rotate, layers of different phosphors for emitting light of predetermined wavelength bands by receiving excitation light being disposed on at least two of the segment areas of the transparent base material and comprises an excitation light source for shining excitation light within a visible light wavelength range on to the phosphors.

BRIEF DESCRIPTION OF THE DRAWINGS

The aforesaid object and further objects, features and advantages of the invention will become apparent further from the following detailed description together with the accompanying drawings, in which.

DETAILED DESCRIPTION OF THE PREFERRED EMBODIMENT

Figure 1:
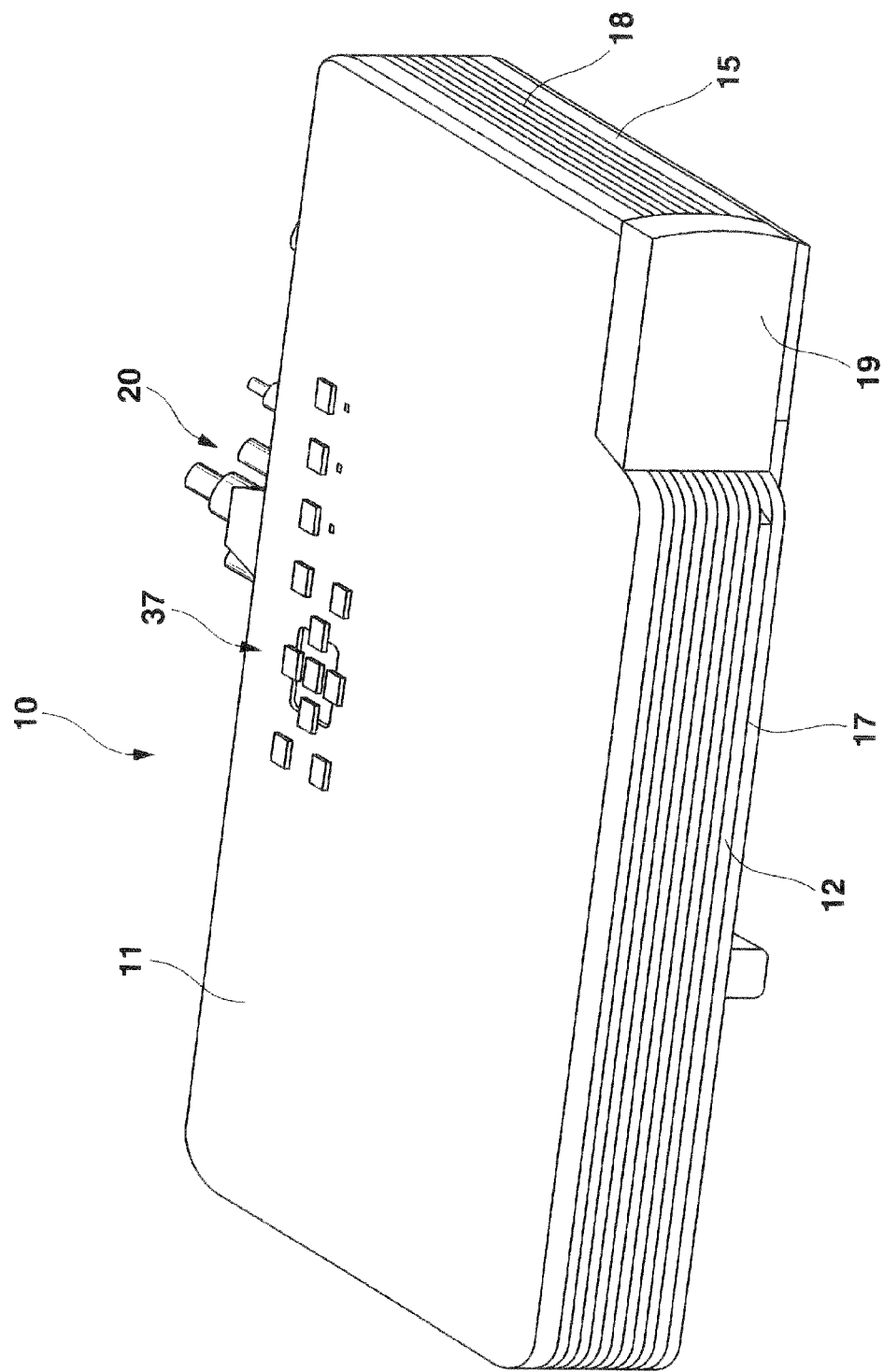
FIG. 1 is a perspective view showing an external appearance of a projector according to an embodiment of the invention.

Hereinafter, a best mode for carrying out the invention will be described by the use of the accompanying drawings. However, while various limitations which are technically preferred to carry out the invention are given to an embodiment which will be described below, it should be noted that the scope of the invention be limited to neither the following embodiment nor illustrated examples.

A projector 10, which is a best mode for carrying out the invention, includes a light source unit 63, a display device 51, a cooling fan, a light source side optical system 61 for guiding light from the light source unit 63 to the display device 51, a projection side optical system 62 for projecting an image emitted from the display device 51 on to a screen and a projector control unit for controlling the light source unit 63 and the display device 51.

In addition, this light source unit 63 has a plurality of fan-shaped segment areas on a circular transparent base material 130 which can be controlled to rotate, layers 131 of different phosphors for emitting light of predetermined wavelength bands by receiving excitation light being disposed on at least two of the segment areas of the transparent base material 130, and includes an excitation light source 72 which shines excitation light within a visible light wavelength range on to the phosphors.

The transparent base material 130 is formed of a glass base material or a transparent resin base material. In addition, a dichroic layer 134, which transmits the excitation light but reflects light of other wavelength bands, is formed through coating on a surface of the transparent base material 130 which lies on the side where the phosphor layers 131 are disposed. Further, a reflectionless coating layer 133 is formed through coating on a surface of the transparent base material 130 which lies on an opposite side to the side where the phosphor layers 131 are disposed.

In addition, the transparent base material 130 has a segment area on which a red phosphor layer 131R is disposed which emits light of a wavelength band of red, which is one of the primary colors of light, and a segment area on which a green phosphor layer 131G is disposed which emits light of a wavelength band of green, which is one of the primary colors of light. Additionally, a diffusion layer 135 is formed on the segment area of the transparent base material 130 on which no phosphor layer 131 is disposed by applying an optical treatment for giving a diffusion effect or disposing an optical substance which can provide such a diffusion effect.

Further, the excitation light source 72 takes the form of a light emitting diode or a laser emitter which shines light of a wavelength band of blue which is shorter than the wavelength bands of the red and green light which are emitted from the red and the green phosphor layers 131R, 131G.

FIG. 1 is a perspective view which depicts an external appearance of a projector 10.

As is shown in FIG. 1, a projector 10 according to an embodiment of the invention has a substantially rectangular parallelepiped shape, and the projector 10 has a lens cover 19 which is provided to a side of a front panel 12, which is a front lateral panel of a body casing of the projector 10, for covering a projection opening, and a plurality of air outlet slots 17 are provided in the front panel 12.

In addition, the projector 10 has a key/indicator part 37 on an upper panel 11 of the body casing, and this key/indicator part 37 includes keys and indicators including a power supply switch key, a power indicator for informing that the power supply is on or off, an overheat indicator for informing of overheat of the light source unit and the like.

Further, when looking at a back side of the body casing, the projector 10 has on a back panel thereof an input/output connector part where a USB terminal, an image signal inputting D-SUB terminal, an S terminal, an RCA terminal and the like are provided and various terminals 20 including a power supply adapter plug and the like, a memory card slot, not shown, and an Ir reception part for receiving a control signal from a remote controller.

In addition, the projector 10 has a plurality of air inlet slots 18 which are provided in the vicinity of a lower portion of each of the back panel, a right-hand panel, not shown, which is a lateral panel of the body casing and a left-hand panel 15 which is a lateral panel of the body casing shown in FIG. 1.

Figure 2:
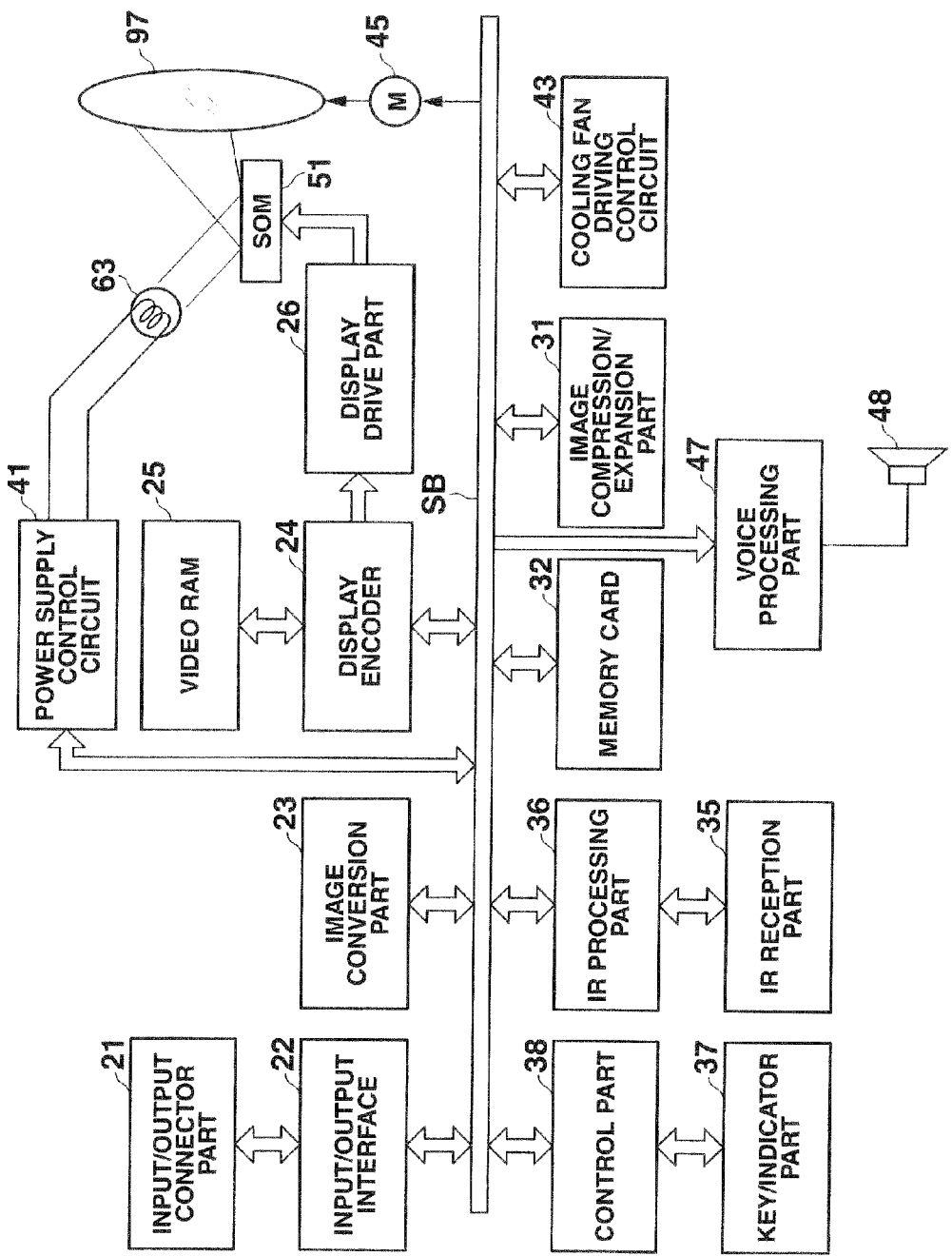
FIG. 2 is a block diagram showing functional circuit blocks of the projector of the embodiment.

FIG. 2 is a block diagram depicting functional circuit blocks of the projector 10.

As is shown in FIG. 2, the projector control unit of the projector 10 has a control part 38, an input/output interface 22, an image transforming part 23, a display encoder 24, and a display driving part 26. Image signals of various standards which are inputted from the input/output connector part 21 are sent to the image transforming part 23 via the input/output interface 22 and a system bus (SB) where the image signals are transformed into a unified image signal in a predetermined format which is appropriate for display and the unified image signal so transformed is then sent to the display encoder 24.

In addition, the display encoder 24 deploys the image signal sent thereto in a video RAM 25 for storage therein and thereafter creates a video signal from the contents stored in the video RAM 25 for output to the display driving part 26.

Then, the display driving part 26, into which video signals are inputted from the display encoder 24, drives the display device 51, which is a spatial optical modulator (SOM), at an appropriate frame rate in response to image signals sent thereto, whereby by causing light from the light source unit 63 to be incident on the display device 51 via an illumination unit for forming the light source side optical system, an optical image is formed by reflected light from the display device 51, and the optical image so formed is then projected on to a screen, not shown, via a projection unit which constitutes the projection side optical system. A movable lens group 97 of the projection side optical system is driven by a lens motor 45 for zooming and focusing.

In addition, an image compression and expansion part 31 performs a recording operation in which a luminance signal and a color difference signal in the image signal are subjected to data compression by ADCT (adaptive discrete cosine transformation) and Huffman coding operations so as to be written sequentially into a memory card 32, which is a detachable recording medium. When in a reproduction mode, the image compression and expansion part 31 reads out image data recorded in the memory card 32 so as to expand individual image data which configure a series of moving pictures recorded in the memory card 32 frame by frame and sends the image data so expanded to the display encoder 24 via the image transforming part 23, whereby the projector 10 enables the display of moving pictures based on the image data stored in the memory cart 32.

Then, the control part 38 governs the control of operations of respective circuits within the projector 10 and is made up of a CPU, a ROM which stores fixedly operation programs such as various types of settings and a RAM which is used as a work memory.

In addition, an operation signal of the key/indicator part 37 which includes main keys and indicators provided on the upper panel 11 of the body casing is sent directly to the control part 38, while a key operation signal from the remote controller is received by the Ir reception part 35, and a code signal demodulated in an Ir processing part 36 is sent to the control part 38.

Note that a sound processing part 47 is connected to the control part 38 via the system bus (SB). The sound processing part 4 includes a sound source circuit such as a PCM sound source and converts sound data into analog signals so as to radiate sound loudly via a speaker 48 which is driven for this purpose when in projection, mode and reproduction mode.

In addition, the control part 38 controls a power supply control circuit 41, and when the power supply switch key is operated, the power supply control circuit 41 illuminates the light source unit 63. Further, the control part 38 also controls a cooling fan drive control circuit 43, and this cooling fan drive control circuit 43 causes a plurality of temperature sensors provided on the light source unit 63 and the like to detect temperatures in locations where they are provided for control of the rotational speed of the cooling fan. The cooling fan drive control circuit 43 also causes the cooling fan to continue rotating by the use of a timer even after the light source unit 63 has been turned off. Further, depending upon the results of temperature detections by the temperature sensors, the cooling fan drive control circuit 43 controls the light source unit 63 to stop to thereby switch off the power supply of the projector main body.

Figure 3:
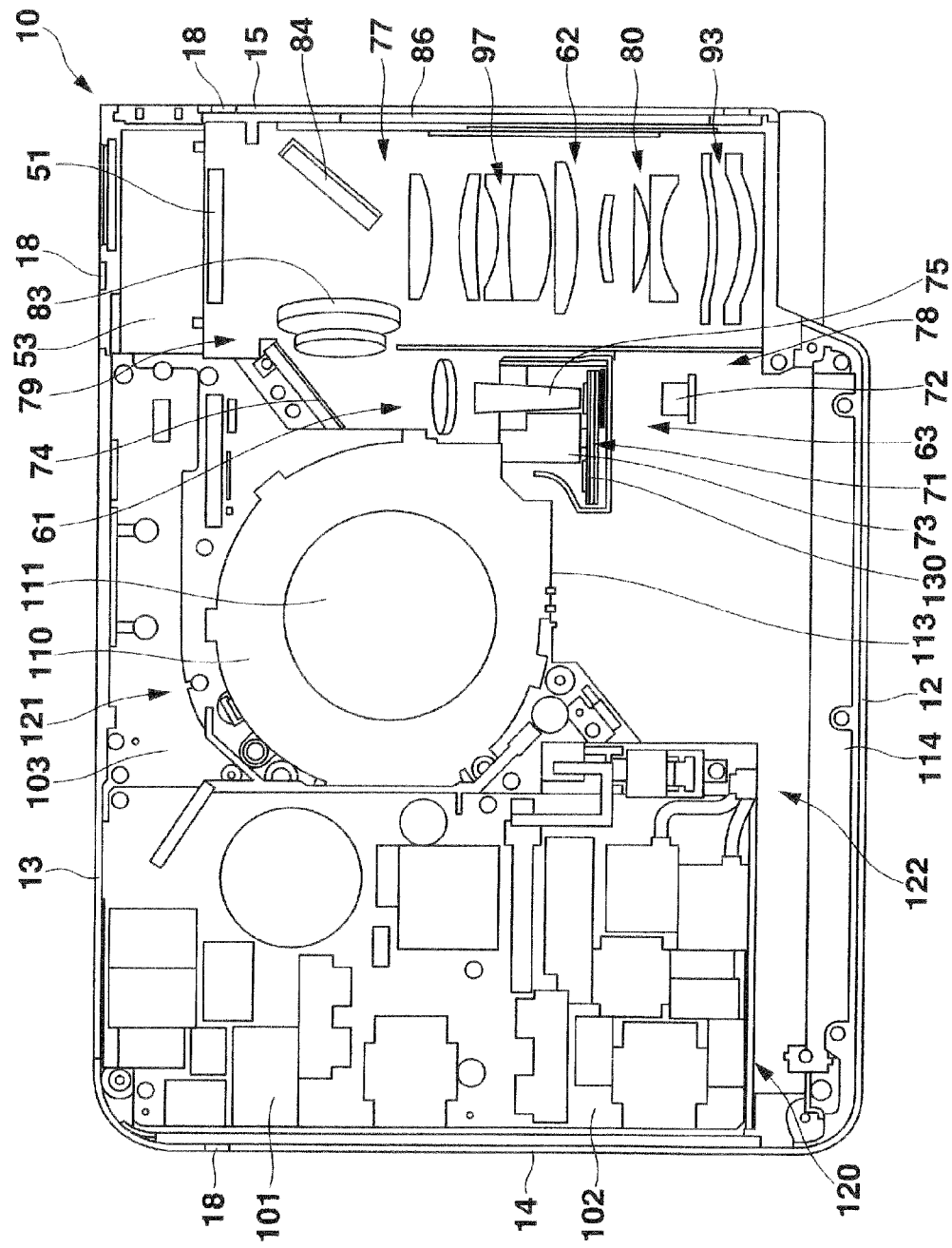
FIG. 3 is a plan view of the projector of the embodiment with a top panel removed.

FIG. 3 is a plan view of the projector 10 with the top panel 11 removed.

As is shown in FIG. 3, the projector 10 has an interior construction in which a power supply control circuit board 102 on which a light source power supply circuit block 101 is mounted is disposed in the vicinity of the right-hand panel 14 and an interior of a projector housing is partitioned airtightly into an air inlet side space compartment 121 lying on the back panel 13 side and an air outlet side space compartment 122 lying on the front panel 12 side by a partition bulkhead 120. Further, a sirocco fan type blower 110 is disposed as a cooling fan in the vicinity of the center of the projector 10, and an inlet port 111 of the blower 110 is positioned in the air inlet side space compartment 121 and an outlet port 113 of the blower 110 is positioned in the air outlet side space compartment 122.

In addition, the light source unit 63 is disposed in the air outlet side space compartment 122, an optical unit block 77, which is made up of an illumination side block 78, an image creating block 79 and a projection side block 80, is disposed along the left-hand panel 15, part of the illumination unit which is provided in the illumination side block 78 of the optical unit block 77 in such a mariner that the illumination side block 78 is made to open to the air outlet side space compartment 122 for communication therewith is disposed so as to be positioned in the air outlet side space compartment 122, and an outlet air temperature reduction device 114 is disposed along the front panel 12 of the air outlet side space compartment 122.

In addition, the blower 110, which functions as the cooling fan for cooling the light source unit 63, has the inlet port 111 in a central portion and the outlet port 113 which has a substantially square cross section and is connected to the partition bulkhead 120, so that air from the blower 110 is discharged into the air outlet side space compartment 122 which is partitioned by the partition bulkhead 120. A control circuit board 103 is disposed in the vicinity of the inlet port 111 of the blower 110.

In addition, the optical unit block 77 is made up of the three blocks including the illumination side block 78 which is disposed in the vicinity of the light source unit 63 and which includes part of the illumination unit for emitting light emitted from the light source unit 63 towards the image creating block 79, the image creating block 79 which includes part of the illumination unit and the display device 51 and which reflects the light emitted from the illumination side block 78 towards the projection side block 80 in accordance with image data, and the projection side block 80 which includes the projection unit, which is disposed in the vicinity of the left-hand panel 15 and which projects the light reflected by the image creating block 79.

As part of the illumination unit which forms the light source side optical system 61 included in the illumination side block 78, there is included a light guiding or smoothing unit 75 for making light emitted from the light source unit 63 into a light beam whose intensity is uniformly distributed across the width thereof as it travels down this light smoothing unit 75.

In addition, as part, of the illumination unit which forms the light source side optical system 61 which is included in the image creating clock 79, there is included a reflection mirror 74 for changing the directions of a light beam emitted, from the light smoothing unit 75, a condensing lens group 83 for concentrating the light beam reflected by the reflection mirror 74 on to the display device 51 and an shining mirror 84 for shining the light beam that, has passed through the condensing lens group 83 at a predetermined angle towards the display device 51. In addition, the image creating block 79 also includes the display device 51, and a DMD is adopted as configuring the display device 51. Further, a display device heat dissipating panel 53 is disposed on a back panel 13 side of the display device 51 for cooling the display device 51.

In this DMD, a plurality of micromirrors are disposed in a matrix fashion, and light incident, thereon from an incident direction which is silted in one direction relative to a front facing direction is reflected separately as light in an on state where the light is reflected in the front direction and light in an off state where the light is reflected in an oblique direction by causing the plurality of micromirrors to tilt to switch between an on position and an off position so as to form an image. Specifically, light incident on the micromirror which is tilted in one tilted direction or in the on position is reflected in the front direction by the micromirror in question as light in the on state, while light incident on the different micromirror which is tilted in the other tilted direction or in the off position is reflected in the oblique direction by the micromirror as light in the off state, whereby the on-state light reflected in the front direction is shone as a bright light beam, while the off-state light reflected in the oblique direction is absorbed by a light absorber plate, producing a dark or black indication, an image thus being created.

In addition, the projection side block 80 includes the projection unit which has a fixed lens group 93 and a movable lens group 97 which form the projection side optical system 62 for shining a pencil of image-forming bright light on to the screen, not shown. In addition, the projection unit is made into a variable focus lens by the lens groups of the projection side optical system 62, in which the movable lens group 97 is shifted along an optical axis thereof by controlling the lens motor 45 by an optical system control circuit board 86 which is disposed between the optical unit block 77 and the left-hand panel 15 so as to enable zooming and focusing.

In addition, the light source unit 63 is such as to include a fluorescent wheel 71 which emits light of wavelength bands of the respective colors to the light smoothing unit 75 by receiving excitation light from an excitation light source 72, and this fluorescent wheel 71 is provided in such a manner as to be rotated by a wheel motor 73 which is attached to a central portion of a disk-shaped transparent base material 130.

Figure 4:
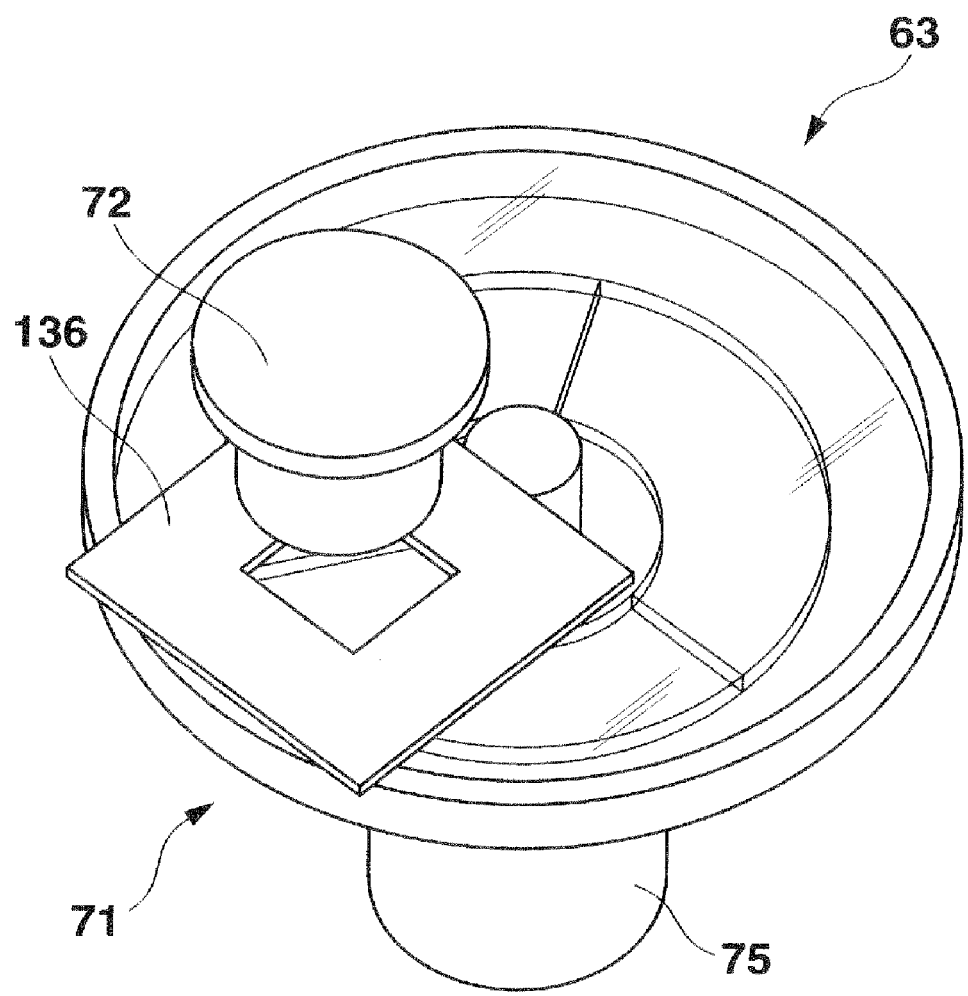
FIG. 4 is a perspective view showing an external appearance of a light source unit according to the embodiment.
Figure 5A:
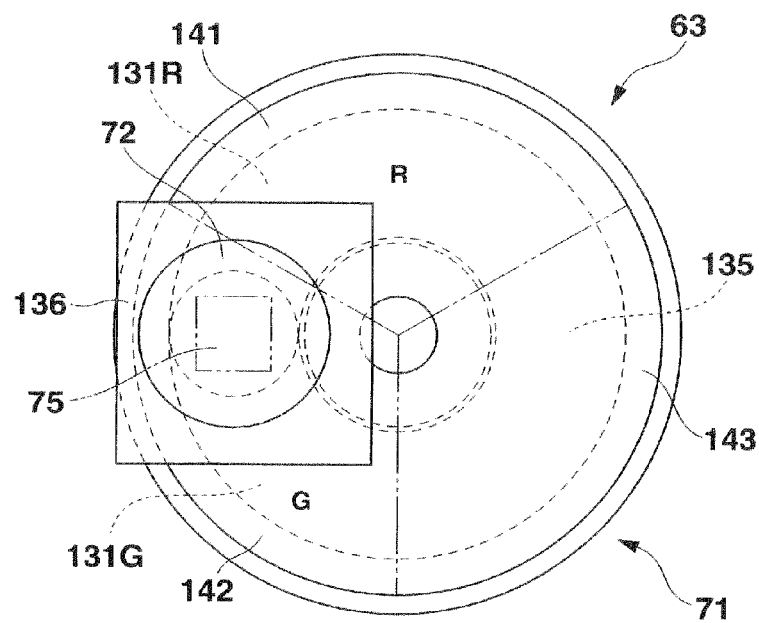
FIG. 5A is a plan view of the light source unit, according to the embodiment.
Figure 5B:
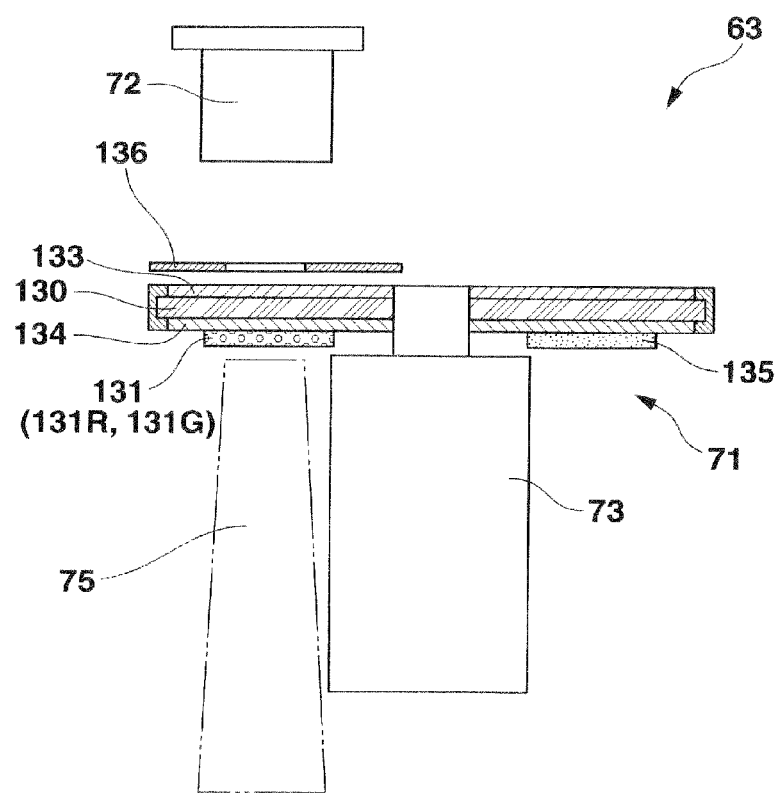
FIG. 5B is a front sectional view of the light source unit according to the embodiment.

In addition, as is shown in FIGS. 4, 5A and 5B, the light source unit 63 includes the fluorescent wheel 71 which includes layers 131 of phosphors and the excitation light source 72 which shines excitation light on to phosphors of the phosphor layers 131. Additionally, this light source unit 63 is configured in such a manner that when excitation light is shone on to the fluorescent wheel 71 from the excitation light, source 72, light of predetermined wavelength bands is emitted from phosphors of the phosphor layers 131 and the light so emitted is then made to be incident on the light smoothing unit 75.

The fluorescent wheel 71 is made up of the circular transparent base material 130 which includes the layers 131 of phosphors and the wheel motor 73, and a circular opening which corresponds to the shape of a cylindrical rotor which configures a connecting portion with the wheel, motor 73 is formed in a central portion of the transparent base material 130, whereby the fluorescent wheel 71 and the wheel motor 73 are made integral by the rotor being inserted in place in the circular opening. By this configuration, the fluorescent wheel 71 is made to rotate by the wheel motor 73 at a rotational speed of 120 revolutions per second, for example.

This transparent base material 130 has a plurality of fan-shaped segment areas and is formed of a glass base material or a transparent resin material. In addition, this transparent base material 130 is such that the layers 131 of phosphors are disposed on at least two of the segment areas. The respective layers 131 of phosphors emit light of predetermined wavelength bands which are different when receiving excitation light emitted from the excitation light source 72.

In this embodiment, the transparent base material 130 has three or first to third segment areas 141 to 143. A red phosphor layer 131R which emits light of a wavelength band of red (R), which is one of the primary colors of light, is secured to one side of the first segment area 141, and a green phosphor layer 131G which emits light of a wavelength band of green (G), which is one of the primary colors of light, is secured to one side of the second segment area 142. Further, no phosphor layer 131 is disposed on the third segment area 143, and an optical substance which imparts a diffusion effect is disposed as a diffusion layer 135 on a side of the third segment area 143 which lies on the same side of the first and second segment areas 141, 142 where the phosphor layers 131 are disposed.

In addition, the transparent base material 130 can be formed by three filter pieces which correspond to the three segment areas 141 to 143. As this occurs, the phosphor layers 131 are secured to the corresponding filter pieces and the diffusion layer 135 is formed on the corresponding filter piece. Thereafter, the filter pieces are combined and bonded together or may be integrated into one unit by mounting members to form a circular shape.

In addition, the phosphor layers 131 are each formed by a phosphor crystal and a binder. As the diffusion layer 135, a solid substance which is an optical substance may be secured, and in addition to this, the diffusion layer 135 may be formed by applying an optical treatment such as a roughening operation by blasting to the surface of part in question of the transparent material 130.

Additionally, a dichroic layer 134 which transmits excitation light but reflects light of other wavelength bands is formed through coating on a whole surface of the side of the transparent base material 130 where the phosphor layers 131 are to be disposed, and the phosphor layers 131 are formed on the dichroic layer 134 so formed.

In addition, in this embodiment, although the dichroic layer 134 which transmits excitation light but reflects light of other wavelength bands is formed on the whole surface of the side of the transparent base material 130 where the phosphor layers 131 are disposed, dichroic layers 134 having different properties may be formed on the respective segment areas. For example, a coating is applied on the whole surface of the first segment area 141 which transmits excitation light but reflects light of a wavelength band of red, a coating is applied to the whole surface of the second segment area 142 which transmits excitation light but reflects light of a wavelength band of green, and no such coating is applied to the whole surface of the third segment area 143, so that no dichroic layer 134 is formed thereon.

In addition, a reflectionless coating layer 133 is formed through coating on a surface of the transparent base material 130 which lies on an opposite side to the side where the phosphor layers 131 are disposed.

Additionally, the excitation light source 72 is designed to shine excitation light to the respective segment areas of the transparent base material 130 and takes the form of a light emitting diode or a laser emitter which emits light of a wavelength band of blue which is a visible light whose wavelength is shorter than the wavelength bands of red and green light emitted by the red and green phosphor layers 131R, 131G disposed on the first segment area 141 and the second segment area 142. In this embodiment, this excitation light source 72 is disposed in such a manner as to confront the fluorescent wheel 71 at a front side of the projector 10 so that an optical axis of the excitation light source 72 substantially coincides with an optical axis of the light smoothing unit 75 and becomes parallel to a rotational axis of the fluorescent wheel 71.

In addition, an incident mask 136 having an opening which is formed in such a manner as to correspond to the shape of the light smoothing unit 75 is disposed between the excitation light source 72 and the fluorescent wheel 71 so as to increase the quantity of light of a single color which is emitted from the phosphor of one of the phosphor layers 131 by means of excitation light emitted from the excitation light source 72 to thereby enhance the utilization efficiency of effective light.

Next, light emitted from the fluorescent wheel 71 to be incident on the light smoothing unit 75 will be described. When excitation light is shone on to the first segment area 141 from the excitation light source 72, almost all the excitation light passes through the reflectionless coating layer 133 on the incident surface of the first segment area 141 without being reflected to the excitation light source 72 side and is eventually incident on the transparent base material 130. Then, the excitation light that has passed through the transparent base material 130 passes through the dichroic layer 134 to thereby be shone on to the red phosphor layer 131R. The phosphor of the red phosphor layer 131R absorbs the excitation light to emit light of a red wavelength band in every orientation. In the red light so emitted, light emitted towards the light smoothing unit 75 is incident on the light smoothing unit 75 as it is, while light emitted towards the fluorescent wheel 71 side is reflected by the dichroic layer 134, and much of the reflected light is eventually incident on the light smoothing unit 75 as light emitted from the fluorescent wheel 71.

Similarly, when excitation light is shone on to the second segment area 142 from the excitation light source 72, light of a green wavelength band is emitted as emitted light from the transparent base material 130 and is eventually incident on the light smoothing unit 75.

In addition, when excitation light which is light of a blue wavelength band is shone on to the third segment area 143 from the excitation light source 72, the excited light passes the reflectionless layer 133 on the third segment area 143 and the transparent base material 130 to thereby be shone on to the diffusion layer 135. This diffusion layer 135 is designed to emit, the light incident on the diffusion layer 135 on the third segment area 143 as diffuse light which is similar to the light emitted from the first and second segment areas 141, 142. Consequently, since the diffusion layer 135 which imparts the diffusion effect to the third segment area 143 is formed on the third segment area 143 in the way described above, the light of a blue wavelength band in which the excitation light is diffused is eventually incident on the light smoothing unit 75 as emitted light from, the third segment area 143.

In addition, the light smoothing unit 75 of the embodiment takes the form of a tapered light tunnel which has a hollow, substantially truncated quadrangular pyramid shape. This tapered light tunnel includes a plane of incidence and a plane of emergence which are normal to its optical axis and has four trapezoidal panels which form top, bottom, left-hand and right-hand sides thereof. By the respective panels being bonded and fixed together in the vicinity of ridges thereof, the panels are formed into a substantially truncated quadrangular pyramid shape, in which a cross-sectional area thereof increases while it extends from the plane of incident to the plane of emergence, and inner surfaces of the tapered light tunnel so formed configure reflection surfaces. In addition, by making vertical and transverse lengths of the plane of emergence almost double vertical and transverse lengths of the plane of incidence of the tapered light tunnel, the diffuse light incident on the tapered light tunnel can be formed into a pencil of light which has a divergence of about 30 degrees relative to its optical axis from the plane of emergence.

In addition, the light smoothing unit 75 does not have to be formed into the tapered light tunnel but may be formed into a light tunnel in which vertical and transverse lengths of a plane of incidence and a plane of emergence are the same. Then, a condensing lens group is disposed on an incident plane side of the light tunnel so that the diffuse light emitted from the fluorescent wheel 71 is concentrated to be incident on the light tunnel by the condensing lens group. In addition, the light smoothing unit 75 is not limited to the light tunnels, and hence, a solid glass rod may be adopted from time to time.

By this configuration, when the fluorescent wheel 71 is rotated and excitation light shone from the excitation light source 72 is caused to flicker or flare up and die down alternately, light of red and green, and blue wavelength bands is made to be incident on the light smoothing unit 75 from the fluorescent wheel 71 in a sequential fashion, and the DMD, which is the display device 51 of the projector 10, time-sharing displays data in synchronism with the shining timing of the excitation light source 72, whereby a color image is produced on a screen.

In this way, in the light source unit 63 of the embodiment, by providing the plurality of segment areas on the circular transparent base material 130, disposing the different phosphor layers 131 on at least the two of the segment areas, and providing the excitation light source 72 which shines excitation light, on to the phosphors on the phosphor layers 131, the visible light with lower energy than that of ultraviolet, ray or light can be shone on to the phosphors on the phosphor layers 131 as the excitation light so as to produce the light of the predetermined wavelength bands. Consequently, the light source unit 63 can be provided which can suppress the deterioration with age of the optical component on to which excitation light is shone to thereby maintain its performance over a long period of time and the projector 10 which includes the light source unit 63.

In addition, by the transparent base material 130 being formed of the glass base material, the rigidity can be provided. Alternatively, by the transparent base material 130 being formed of the transparent resin base material, a reduction in weight and production costs can be realized, as well.

Additionally, since the dichroic layer 134 is formed on the surface of the transparent base material 130 which lies on the side where the phosphor layers 131 are disposed, light emitted to the transparent base material 130 side can be reflected to the light smoothing unit 75 side so as to increase the quantity of light which is incident on the light smoothing unit 75.

Further, since the reflectionless coating layer 133 is formed on the surface of the transparent base material 130 on the side which is opposite to the side where the phosphor layers 131 are disposed, the utilization efficiency of excitation light shone from the excitation light source 72 can be enhanced.

In addition, by excitation light from the excitation light source 72 being made into light of the wavelength band whose wavelength is shorter than those of light of the predetermined wavelength bands which is emitted from the respective phosphor layers 131, light of the different wavelength bands from the excitation light can be produced from the phosphors of the respective phosphor layers 131 on to which the excitation light is shone so as to be made use of as single color light sources. Further, by excitation light emitted from the excitation light source 72 being made to pass through the fluorescent wheel 71 as it is, the excitation light source 72 can also be made use of as a single color light source. Therefore, the installation area of the phosphor layers 131, which are relatively expensive, can be reduced, thereby making it possible to provide the light source unit 63 and the projector 10 which includes the light source unit 63 inexpensively.

In addition, since the diffusion layer 135 which imparts the diffusion effect is formed on the segment area of the transparent base material 130 on which no phosphor layer 131 is disposed, excitation light can be diffused, thereby making it possible to realize uniformity between the excitation light so diffuse and the light emitted from the segment areas on which the phosphor layers 131 are disposed.

Further, by adopting the light emitting diode or the laser emitter as the excitation light source 72, compared with the conventional projector which employs the discharge lamp as its light source unit, not only can the electric power consumption be suppressed, but also the light source unit can be made smaller in size.

In addition, as to the combination of the light of the predetermined wavelength band which is shone from the excitation light source 72 and the light of the predetermined wavelength bands which are emitted from the plurality of phosphor layers 131, the invention is not limited to the combination in which the excitation light is made up of the light of blue wavelength band and the light emitted from the fluorescent wheel 71 is made up of the light of wavelength bands of the primary colors of light, and hence, various combination forms can be adopted.

For example, a phosphor layer 131 which emits light of a wavelength band of yellow, which is one of the primary pigment colors, may be disposed on the respective segment areas in addition to the phosphor layers 131 which emit the light of wavelength bands of the primary colors of light. By adopting this configuration, the luminance of the light source unit 63 can be increased so as to realize an enhancement in color reproduction properties.

In addition, phosphor layers 131 may be disposed in a constant disposing pattern in a circumferential direction of the transparent base material 130, so that a phosphor layer disposing pattern of red, green, blue, red, green, blue is realized by providing six segment areas circumferentially so as to emit light of wavelength bands of those three colors in a repeated fashion, whereby the color separation by the rainbow effect can be prevented without varying the rotational speed of the fluorescent wheel 71.

Further, there may be a case where light of a wavelength band of violet is adopted as excitation light shone from the excitation light source 72 and phosphor layers 131 which emit light of wavelength bands of red, green and blue are disposed on the respective segment areas of the fluorescent wheel 71. In addition, in the case of the light of violet wavelength band being adopted as excitation light, a configuration may be adopted in which the light of violet wavelength band is not shone on to the phosphor layers 131 but is made to be diffused by a diffusion layer 135 so that the light of violet wavelength band so diffused is incident on the light smoothing unit 75. Alternatively, the segment area which includes the diffusion layer 135 is not provided, and the phosphor layers 131 may be disposed on all the segment areas so that light of wavelength bands of the respective colors may be produced.

Figure 6:
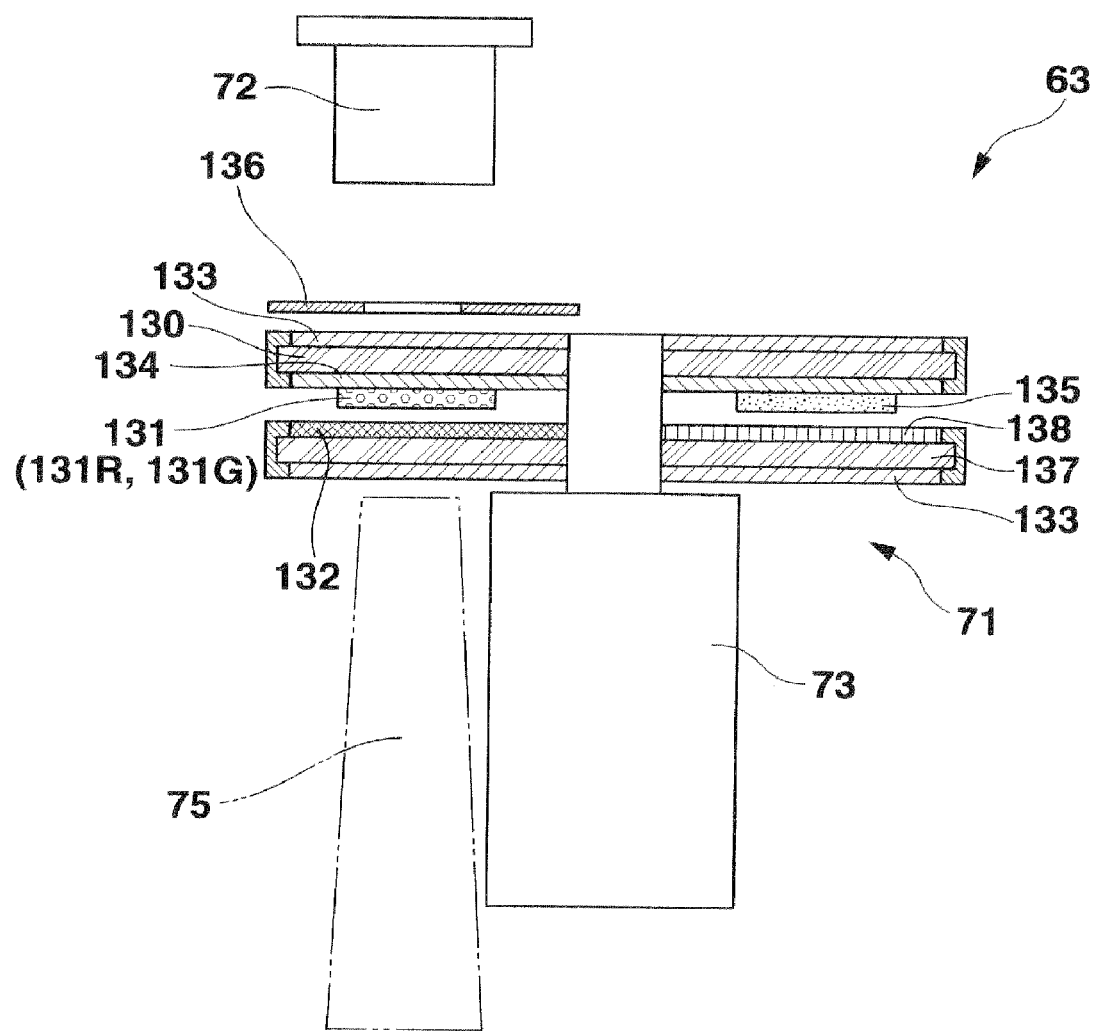
FIG. 6 is another front sectional view of the light source unit according to the embodiment.

In addition, in the light source unit 63 of the invention, as is shown in FIG. 6, there may be a case where an auxiliary transparent base material 137 is disposed on an opposite side of the transparent base material 130 to the side where the excitation light source 72 is disposed, and the auxiliary transparent base material 137 is formed into a circular shape so as to correspond to the shape of the transparent base material 130. This auxiliary transparent base material 137 is such as to have segment areas having the same shape as those of the transparent base material 130. In addition, since the auxiliary transparent base material 137 is secured to the wheel motor 73 as with the transparent base material 130, the auxiliary transparent base material 137 rotates at the same rotational speed as that of the transparent base material 130 with synchronism accomplished therebetween.

In addition, in this auxiliary transparent base material 137, an excitation light reflecting layer 132, which is adapted to reflect excitation light and transmit light of other wavelength bands than light of a wavelength band such as excitation light emitted by the phosphors of the phosphor layers 131, is formed through coating on a predetermined segment area on a surface of a side of the auxiliary transparent base material 137 which faces the transparent base material 130. In addition, a reflectionless coating layer 133 is formed through coating on a whole surface of an opposite side of the auxiliary transparent base material 137 to the side which faces the transparent base material 130.

The segment area on which the excitation light reflecting layer 132 is formed configures a segment area of the auxiliary transparent base material 137 which corresponds to the segment areas where the phosphor layers 131 of the transparent base material 130 which is disposed in such a manner as to face the auxiliary transparent base material 137 are secured. On the other hand, no excitation light reflecting layer 132 but an excitation light transmissive layer 138 which transmits only light of a wavelength band of excitation light is formed on a segment area of the auxiliary transparent base material 137 which corresponds to the segment area of the transparent base material 130 to which no phosphor layer 131 is secured.

In addition, as with what is shown in FIG. 5A, three segment areas are formed on the transparent base material 130 of the fluorescent wheel 71, and a red phosphor layer 131R is secured to a first segment area 141, a green phosphor layer 131G is secured to a second segment area 142, and a diffusion layer 135 is formed on a third segment area 143. In addition, the excitation light source 72 is also made to emit light of a wavelength band of blue. Then, when excitation light is shone on to the first segment area 141 from the excitation light source 72, the excitation light so shone passes through the reflectionless coating layer 133 on an incident surface of the first segment area 141 with almost no excitation light being reflected to the excitation light source 72 and is then incident on the transparent base material 130.

In addition, as is shown in FIG. 6, the excitation light that has passed through the transparent base material 130 passes through the dichroic layer 134 to thereby be shone on to the red phosphor layer 131R. This red phosphor layer 131R absorbs the excitation light and emits light of red wavelength band in every orientation. In the light so emitted, light emitted towards the light smoothing unit 75 is incident on the auxiliary transparent base material 137 side as it is. On the other hand, light emitted towards the transparent base material 130 side is reflected by the dichroic layer 134, and much of the light so reflected comes to be incident on the auxiliary transparent base material 137. However, as this occurs, there exists the excitation light which has passed through the red phosphor layer 131 without being absorbed thereby to thereby be incident on the auxiliary transparent base material 137.

Additionally, when the red emitted light and the blue excitation light is incident on the auxiliary transparent base material 137, the blue excitation light is reflected by the excitation light reflecting layer 132 on the auxiliary transparent material 137 and is incident on the red phosphor layer 131R again to be absorbed therein. Then, light of red wavelength band is emitted from the red phosphor layer 131R, and the light so emitted is incident on the auxiliary transparent base material 137. In addition, the red emitted light that has been incident on the auxiliary transparent base material 137 passes through the excitation light reflecting layer 132, the auxiliary transparent base material 137 and the reflectionless coating layer 133 and is then emitted from the fluorescent wheel 71 to thereby be incident on the light smoothing unit 75.

Similarly, when excitation light is shone on to the second segment area 142 from the excitation light source 72, light of green wavelength band is emitted from the fluorescent wheel 71 and the light so emitted comes to be incident on the light smoothing unit 75. In addition, when excitation light which is light of blue wavelength band is shone on to the third segment area 143 from the excitation light source 72, the excitation light passes through the reflectionless coating layer 133 on the third segment area 143 and the transparent base material 130 to thereby be shone to the diffusion layer 135. Then, the excitation light is emitted as diffuse light by the diffusion layer 135 and is then incident on the auxiliary transparent base material 137 side. Following this, this diffuse light passes through the excitation light transmissive layer 138, the auxiliary transparent base material 137, and the reflectionless coating layer 133, is then emitted from the fluorescent wheel 71 and is eventually incident on the light smoothing unit 75.

In this way, the auxiliary transparent material 137, which has the shape corresponding to the transparent base material 130 and on which the like segment areas to those of the transparent base material 130 are formed, is disposed at the opposite side of the transparent base material 130 to the side thereof which faces the excitation light source 72. By adopting this configuration, the excitation light that has passed through the phosphor layers 131 can be reflected to the transparent base material 130 side so as to be incident on the phosphor layers 131 again for absorption by the phosphors, whereby light of the predetermined wavelength bands can be generated, thereby making it possible to enhance the quantity of light which is incident on the light smoothing unit 75. In addition, since the reflection less coating layer 133 is formed on the opposite side of the auxiliary transparent base material 137 to the side thereof which faces the transparent base material 130, the utilization efficiency of emitted light can be enhanced.

Figure 7:
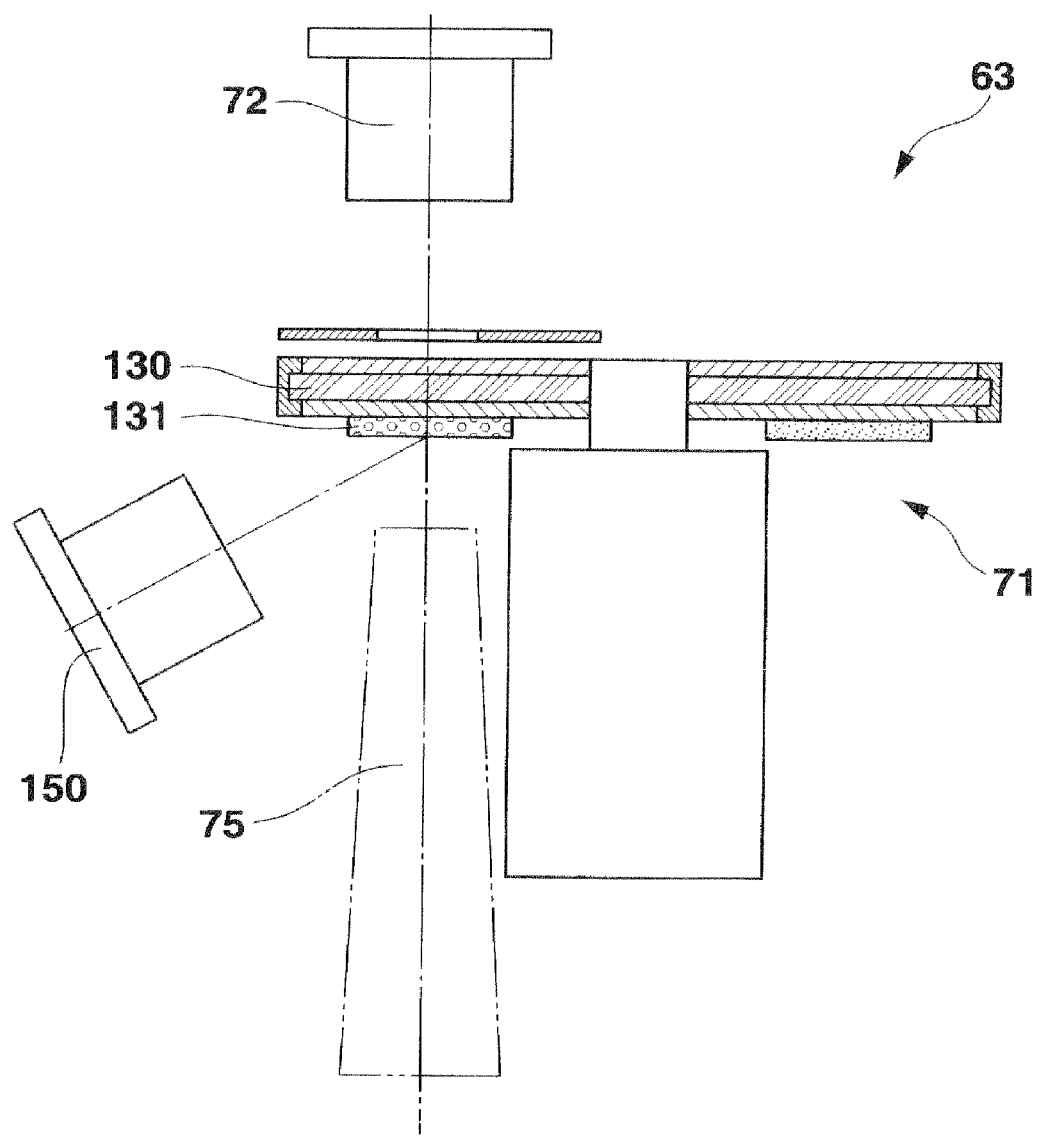
FIG. 7 is a further front sectional view of the light source unit according to the embodiment.

In addition, in the light source unit 63 of the invention, there may be a case where an auxiliary excitation light source 150 is provided together with the excitation light source 72 as is shown in FIG. 7 with a view to enhancing the quantity of light which is incident on the light smoothing unit 75. In the case of the light source unit 63 being so configured, the transparent base material 130 having the segment areas is disposed between the excitation light source 72 and the auxiliary excitation light source 150.

Additionally, in this light source unit 63, the excitation light source 72 is provided at the opposite side of the transparent base material 130 to the side thereof from which light is emitted, and the excitation light source 72 is disposed in such a manner that an optical axis thereof becomes parallel to the rotational axis of the fluorescent wheel 71. On the other hand, the auxiliary excitation light source 150 is disposed at a predetermined angle in a position which is spaced a predetermined distance apart from the optical axis of the excitation light source 72 so that excitation light emitted from the auxiliary excitation light source 150 is shone on to the phosphor layers 131 on the transparent, base material 130 and so as not to cut off light emitted from the fluorescent wheel 71 to be incident on the light smoothing unit 75.

By adopting this configuration, since the excitation light can also be shone on to the phosphor layer 131 with low luminous efficiency from the auxiliary excitation light source 150, the quantity of light emitted from the phosphor layers 131 can be increased so as to increase the quantity of light which is incident on the light smoothing unit 75. In addition, with the fluorescent wheel 71 driven to rotate, when the segment area on which no phosphor layer 131 is disposed comes to be positioned on an optical axis of the auxiliary excitation light source 150 and when the segment area on which the phosphor layer 131 with high luminous efficiency is disposed comes to be so positioned, the auxiliary excitation light source 150 is turned off. Namely, by turning on the auxiliary excitation light source 150 only when the segment area on which the phosphor layer 131 with low luminous efficiency is disposed comes to be positioned on the optical axis of the auxiliary excitation light source 150, the consumption of electric power can be suppressed.

In addition, in the case of the phosphor layers 131 being provided on all the segment areas, the excitation light source 72 may be disposed at the light emission side of the fluorescent wheel 71, and the excitation light source 72 does not necessarily have to be disposed in such a manner that the optical axis thereof become parallel to the rotational axis of the fluorescent wheel 71. By this, since a plurality of excitation light sources 72 can be adopted or a degree of freedom in disposition thereof can be provided, an increase in light quantity and a reduction in size of the light source unit can be facilitated.

Additionally, the shape of the segment areas which are disposed on the phosphor layers 131 is not limited to the fan shape as is shown in the Figs, and hence, there may be a case where other shapes can be adopted which includes an ellipse in which a rotating circumferential direction configures a major axis.

In addition, the invention is not limited to the embodiment and its modified examples that, have been described heretofore and, hence, can be modified or improved variously without departing from the spirit and scope of the invention.

Although the embodiment and the various modified examples thereof have been described heretofore, the invention is not limited thereto. Consequently, the scope of the invention is to be limited only by the scope of the following claims.

What is claimed is:

1. A light source comprising:
   a light source unit comprising (i) a plurality of segment areas on a circular transparent base material which can be controlled to rotate, (ii) layers of different phosphors for emitting light of predetermined wavelength bands, respectively, by receiving excitation light, the layers being disposed on at least two of the segment areas of the transparent base material, and (iii) an excitation light source for shining excitation light within a visible light wavelength range onto the phosphors; and
   a light guiding unit which makes light emitted from the light source unit into a light beam whose intensity is uniformly distributed, wherein the light guiding unit has a rectangular opening into which the light emitted from the light source unit is incident;
   wherein an incident mask having a rectangular opening which corresponds in shape to the opening of the light guiding unit is disposed between the excitation light source and the circular transparent base material.

2. A light source as set forth in claim 1, wherein at least one of the segment areas comprises a transmissive area which transmits the excitation light.

3. A light source as set forth in claim 1, wherein the transparent base material comprises a glass base material or a transparent resin base material.

4. A light source as set forth in claim 1, wherein a dichroic layer which transmits the excitation light and reflects light of other wavelength bands is formed on a surface of a side of the transparent base material where the phosphor layers are disposed.

5. A light source as set forth in claim 1, wherein a reflectionless coating layer is formed on a surface of the transparent base material on a side of the transparent base material opposite from a side where the phosphor layers are disposed.

6. A light source as set forth in claim 1, wherein the excitation light source shines light of a wavelength band whose wavelength is shorter than wavelengths of the predetermined wavelength bands of the light emitted by the phosphors.

7. A light source as set forth in claim 1, wherein a diffusion layer which imparts a diffusion effect is formed on a segment area of the transparent base material on which none of the phosphor layers is disposed.

8. A light source as set forth in claim 1, wherein the excitation light source is a light emitting diode or a laser emitter which shines light of a wavelength band of blue.

9. A light source as set forth in claim 1, wherein each phosphor emits light of a wavelength band of one of the primary colors of light or a complementary color by receiving the excitation light.

10. A light source as set forth in claim 1, wherein one of the phosphor layers emits light of a wavelength band of red, and another of the phosphor layers emits light of a wavelength band of green.

11. A light source as set forth in claim 1, wherein one of the phosphor layers emits light of a wavelength band of yellow.

12. A light source as set forth in claim 1, wherein the phosphor layers are formed on the transparent base material in a constant disposing pattern in a repeated fashion along a circumferential direction of the transparent base material.

13. A light source as set forth in claim 1, wherein an auxiliary transparent base material which can be controlled to rotate in synchronism with the transparent base material is disposed concentrically with the transparent base material, and
   wherein an excitation light reflecting layer which reflects the excitation light and transmits the light of the wavelength bands emitted by the phosphors is formed on a surface of a side of the auxiliary transparent base material which faces the transparent base material in such a manner as to correspond to the respective segment areas on the transparent base material.

14. A light source as set forth in claim 13, wherein a reflectionless coating layer is formed on a surface of the auxiliary transparent base material on a side of opposite from the side which faces the transparent base material.

15. A projector comprising:
   the light source as set forth in claim 1;
   a display device;
   a light source side optical system, comprising the light guiding unit, for guiding light from the light source unit to the display device;
   a projection side optical system for projecting an image emitted from the display device onto a screen; and
   a projector control unit for controlling the light source unit and the display device.

16. A light source as set forth in claim 1, wherein the light source unit further comprises:

an auxiliary excitation light source;

wherein the transparent base material is disposed between the excitation light source and the auxiliary excitation light source;

wherein the excitation light source is provided on a side of the transparent base material that is opposite from a side from which the light from the phosphors is emitted; and wherein the auxiliary excitation light source is provided on a side of the transparent base material that is opposite from the side on which the excitation light source is provided, and the auxiliary excitation light source is disposed at an angle and at a position that is spaced apart from an optical axis of the excitation light source, such that excitation light emitted from the auxiliary excitation light source is shone onto a same phosphor layer as the excitation light emitted from the excitation light source.

* * * * *